United States Patent [19]

Tennant

[11] Patent Number: 4,765,411

[45] Date of Patent: Aug. 23, 1988

[54] ULTRAVIOLET-CURED HORSE SHOE AND METHOD OF SHOEING HOOFED ANIMALS

[76] Inventor: Jerald L. Tennant, 806 Greentree La., Duncanville, Tex. 75137

[21] Appl. No.: 4,675

[22] Filed: Jan. 20, 1987

[51] Int. Cl.$^4$ .................... A01L 3/02; A01L 5/00
[52] U.S. Cl. ............................. 168/4; 168/DIG. 1
[58] Field of Search ............... 168/4, 14, 17, DIG. 1; 59/900

[56] References Cited

U.S. PATENT DOCUMENTS

| | | | |
|---|---|---|---|
| T889,004 | 8/1971 | Hyche et al. | 168/4 |
| 3,469,631 | 9/1969 | Becker | 168/4 |
| 3,476,190 | 11/1969 | Jenny et al. | 168/4 |
| 3,490,536 | 1/1970 | Hourlier | 168/4 |
| 3,494,422 | 2/1970 | Clark | 168/4 |
| 3,519,079 | 7/1970 | Bieber | 168/4 |
| 3,747,684 | 7/1973 | Wallen | 168/28 |
| 3,907,036 | 9/1975 | Capone | 168/26 |
| 3,921,721 | 11/1975 | George | 168/4 |
| 4,206,811 | 6/1980 | Dallmer | 168/4 |
| 4,235,292 | 11/1980 | Dallmer | 168/4 |
| 4,237,981 | 12/1980 | Stubbe | 168/4 |
| 4,265,314 | 5/1981 | Tovim | 168/4 |
| 4,513,824 | 4/1985 | Ford | 168/4 |
| 4,513,825 | 4/1985 | Murphy | 168/12 |

OTHER PUBLICATIONS

Davis, L. G.; Baker, W. T.; Cox, E. A.; Marshall, J.; and Moseley, T. J., "Optical Hazards of Blue Light Curing Units: Preliminary Results", British Dental Journal, vol. 159, No. 8, pp. 259–262, Oct. 1985.

Craig, R. G., "Chemistry, Composition, and Properties of Composite Resins", Dental Clinics of North America, vol. 35, No. 2, pp. 219–239, Apr. 1981.

Bassiouny, M. A. and Grant, A. A., "A Visible Light-Cured Composite Restorative", British Dental Journal, vol. 145, pp. 327–330, Dec. 1978.

Watts, D. C.; Amer, O.; and Combe, E. C., "Characteristics of Visible-Light-Activated Composite Systems", British Dental Journal, vol. 156, pp. 209–215, Mar. 1984.

Instruction Brochure for Den—Mat, Inc.

*Primary Examiner*—Robert P. Swiatek
*Assistant Examiner*—Marie Britt
*Attorney, Agent, or Firm*—Richards, Harris, Medlock & Andrews

[57] ABSTRACT

A method of shoeing a hoofed animal is provided and includes the step of forming a mold (12) having a general configuration of a shoe for the hoof (80). The mold (12) is filled with a liquid acrylic material (64). The hoof (80) of the animal is placed within the mold (12). The acrylic material is cured utilizing ultraviolet light (50, 52), such that the liqid acrylic material solidifies and is integrally joined to the hoof (80) without any intervening adhesive or mechanical attachment. The hoof (80) is then removed from the mold (12).

5 Claims, 2 Drawing Sheets

ULTRAVIOLET-CURED HORSE SHOE AND METHOD OF SHOEING HOOFED ANIMALS

TECHNICAL FIELD

This invention relates to shoes for hoofed animals, and more particularly to a shoe and method of shoeing hoofed animals using ultraviolet-cured acrylic material.

BACKGROUND ART

For years farriers have practiced the skill of shoeing hoofed animals with no substantial changes in the techniques employed. The usual procedure of shoeing a hoofed animal is to trim the keratinous portion of the hoof to the required length, and then an iron shoe is forged to match the trimmed hoof. Once the shoe has cooled, the shoe is attached to the hoof utilizing nails hammered through holes in the shoe into the hoof so that the nails project through the hoof wall. The projecting nails are then cutoff and cleated over as necessary.

The above process is generally most satisfactory, however, this method can cause many foot and leg ailments in the animal. For example, if when shoeing, a nail penetrates the sensitive part of a foot or if the animal casts off a shoe, leaving some nails projecting from the bottom of the hoof and on which the animal subsequently steps acute problems can be caused. Furthermore, an animal with brittle horn material sometimes cannot be shod because the nails would split the material. Although attempts have been made to eliminate the metal shoe and/or nails, they have proved unacceptable for general use.

Plastic shoes have been proposed to eliminate the metal shoe. However, such plastic shoes have failed due to the ineffectiveness and reliability of the adhesive utilized to attach the plastic shoe to the hoof. Adhesive fails under normal circumstances including an exposure to water, shock, repeated flexing, extremes of temperature and other conditions during use. The methods and equipment employed in an attempt to produce a practically acceptable cure time have not been successful even with the inclusion of heat generating devices within the adhesive or heat conducting apparatus in contact with the adhesives.

A further method is suggested in U.S. Pat. No. 3,476,190 issued on Nov. 4, 1969 and entitled "Hoof-Covering and Method of Its Manufacture" which discloses casting a plastic shoe directly onto the hoof of an animal. Special treatment of the hoof is required by providing borings or openings in the hoof in which the plastic material flows for binding of the shoe to the hoof. Additionally, a mold must be fixed around the hoof of the animal rendering the molding process difficult and time consuming.

A need has thus arisen for a plastic shoe for a hoofed animal which can be cured in place with minimal cure time and which positively adheres to the hoof of the animal. The method of shoeing the hoofed animal must be simple and should be one that does not require significant hoof preparation prior to the shoeing operation.

DISCLOSURE OF THE INVENTION

In accordance with the present invention, an ultraviolet-cured shoe and method of shoeing a hoofed animal is provided which substantially eliminates the problems heretofore associated with shoeing procedures.

In accordance with the present invention, a method of shoeing a hoofed animal is provided. The method includes forming a mold having the general configuration of a shoe for the hoof. The mold is filled with a liquid plastic material, and the hoof of the animal is placed in the liquid filled mold. The liquid material is cured by exposing the material to ultraviolet light such that the material solidifies and is bonded to the hoof of the animal without any intervening adhesive material. The hoof with attached shoe is then removed from the mold.

In accordance with another aspect of the present invention, a shoe for attachment to the hoof of an animal is provided. The shoe comprises ultraviolet-cured acrylic material which is cured while the hoof is in contact with the acrylic material, such that the hoof and acrylic material are bonded when cured.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION

Figure 1:
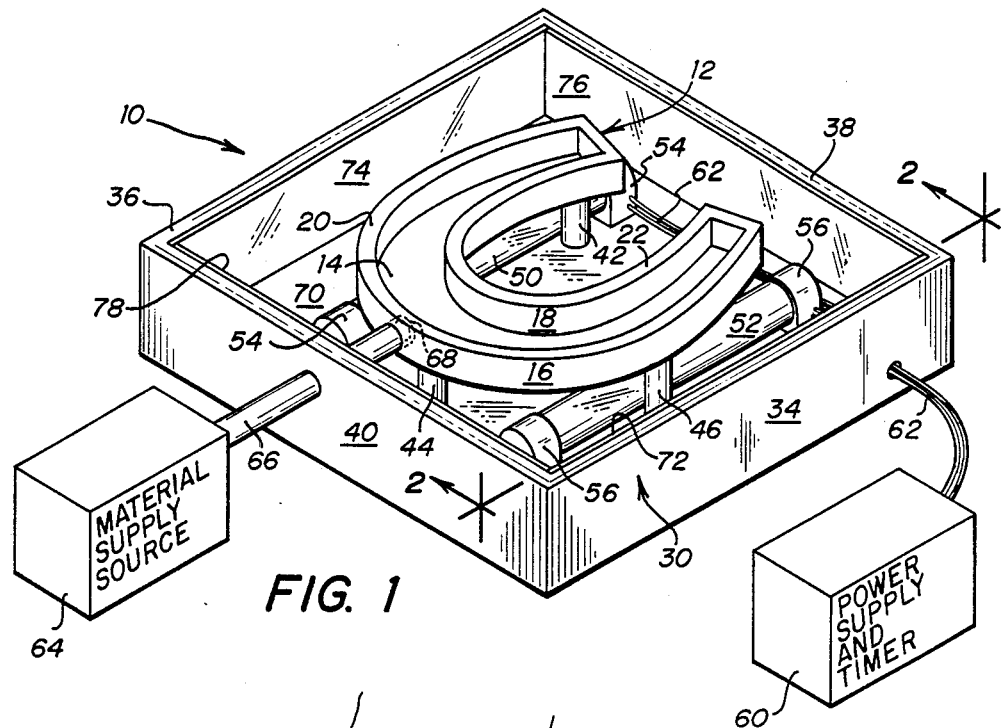
FIG. 1 is a diagrammatic illustration of the present casting mold and housing utilized in practicing the method of the present invention.

Referring to FIG. 1, a casting mold and housing utilized to practice the method of the present invention for casting a shoe in accordance with the present invention is illustrated, and is generally identified by the numeral 10. Although the present method and shoe will be discussed in connection with a shoe for a horse, it is understood that the present method and shoe can be utilized for any type of hoofed animal. Casting mold and housing 10 includes a casting mold, generally identified by the numeral 12 which is generally configured in the shape of a horseshoe. Casting mold 12 includes a bottom wall 14, sidewalls 16 and 18 and top walls 20 and 22. Casting mold 12 is formed of plexiglas or other similar material and is transparent.

Casting mold 12 is disposed within a housing, generally identified by the numeral 30 having a bottom wall 32 (FIG. 2), sidewalls 34 and 36 and end walls 38 and 40. Casting mold 12 is supported centrally within housing 30 and above bottom wall 32 utilizing supports 42, 44 and 46.

Disposed within housing 30 and between casting mold 12 and bottom wall 32 of housing 30 are ultraviolet bulbs 50 and 52. Bulbs 50 and 52 are mounted within sockets 54 and 56 respectively, which provide power received from a power supply and timer 60 for energizing bulbs 50 and 52. Power supply and timer 60 are connected to sockets 54 and 56 using wires 62.

The material utilized for molding the shoe of the present invention is supplied from a material supply source 64 via a delivery tube 66 to casting mold 12. The material enters casting mold 12 through an aperture 68. The material utilized for forming the shoe of the present invention includes a composite resin material that includes a monomer such as, for example, an acrylic monomer, that may be polymerized when exposed to ultraviolet light. Included in the composite mixture is an initiator for the polymerization such as a benzoin alkyl ether, where the alkyl group is commonly a methyl or ethyl group. Additionally, the present invention can be utilized with materials that are light cured utilizing visible light. Such materials include a composite resin mixture composed of monomers such as, for example, a urethane dimethacrylate and ethylene glycol dimethacrylate. Initiators sensitive to visible light such as a diketone, for example, camphoroquinone, in combination with an organic amine are included in the composite mixture. A light source such as a quartz halogen lamp may be filtered to eliminate all but visible light for use in the curing process. The acrylic material is injected into casting mold 12 in a liquid state and is subsequently cured through exposure to ultraviolet light. The curing time can be set utilizing power supply and timer 60.

In order to ensure that the entire casting mold 12 is exposed to ultraviolet light generated by bulbs 50 and 52, the interior surfaces of housing 30 are coated with a mirror-like surface. As more clearly shown in FIG. 2, the interior of bottom wall 32 of housing 30 includes a mirrored surface 70, the interior surfaces of sidewalls 34 and 36 include a mirrored surface 72 and 74, respectively, and the interior surfaces of end walls 38 and 40 include a mirrored surface 76 and 78, respectively.

Figure 2:
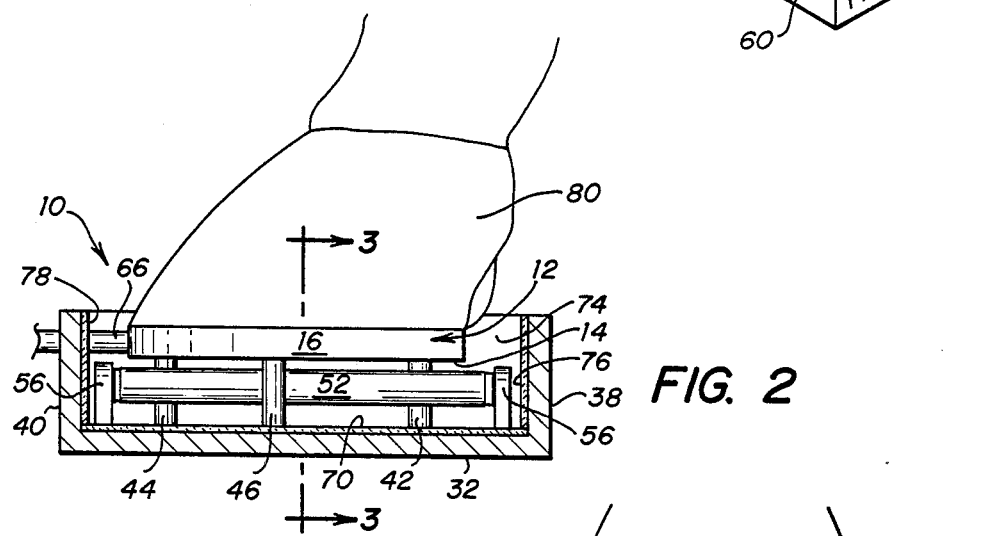
FIG. 2 is a sectional view taken generally along sectional lines 2—2 of FIG. 1 including the hoof of an animal placed within the present casting mold.
Figure 3:
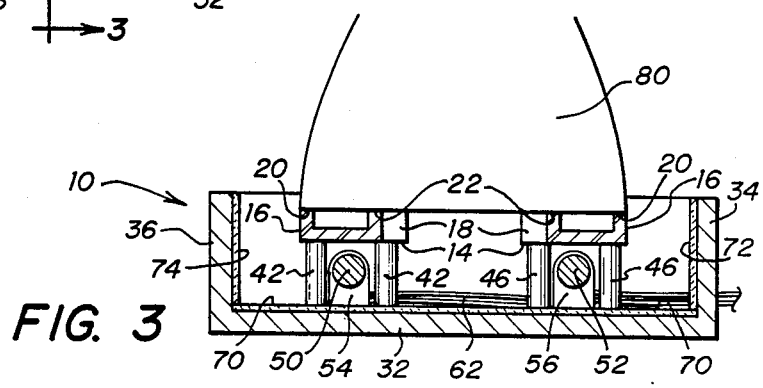
FIG. 3 is a sectional view taken generally along section lines 3—3 of FIG. 2.

Referring simultaneously to FIGS. 1, 2 and 3, the method of the present invention for shoeing a hoofed animal will now be described. FIGS. 2 and 3 illustrate the placement of a horse hoof 80 within housing 30 and above casting mold 12. The bottom of hoof 80 is placed along top walls 20 and 22 of casting mold 12 which supports the hoof above casting mold 12. The area of hoof 80 between sidewalls 16 and 18 comes in contact with the liquified acrylic material supplied by material supply source 64. The acrylic material penetrates into the porous interstities of hoof 80 and upon curing becomes bonded to hoof 80. The resulting shoe formed utilizing the method of the present invention is illustrated in FIG. 4.

Figure 4:
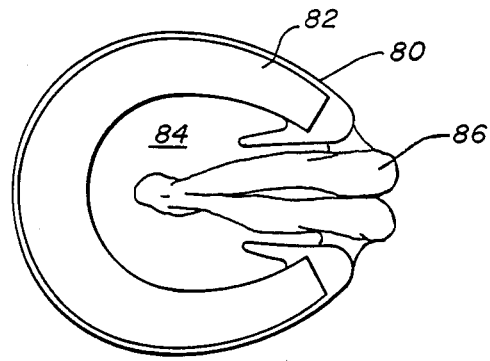
FIG. 4 is a bottom plan view of a hoof and the shoe of the present invention.

FIG. 4 illustrates the bottom of hoof 80 (FIGS. 2 and 3) including a shoe 82 formed from ultraviolet-cured acrylic material and which is bonded to hoof 80. FIG. 4 also illustrates the sole 84 and frog 86 of hoof 80. Therefore it can be seen that the method of the present invention merely requires the placing of a hoof of an animal into casting mold 12, such that the hoof comes into contact with the acrylic material in the liquified state. Upon energization of bulbs 50 and 52, the acrylic material solidifies and becomes bonded to hoof 80. Minimal preparation of hoof 80 is required prior to its insertion into casting mold 12. The underside of hoof 80 may be smoothed prior to insertion into casting mold 12; however, any unevenness in this surface is compensated for by casting mold 12. The duration that ultraviolet bulbs 50 and 52 are energized is controlled by power supply and timer 60. The timer setting may be selected based upon the type of acrylic material utilized and is well known to one skilled in the art. Shoe 82 (FIG. 4) once cured, can only be removed by the mechanical cutting of the shoe-hoof combination from hoof 80.

Shoe 82 can be fabricated and sized utilizing a casting mold 12 of various sizes depending upon the hoof size and type of animal to be shoed. Additionally, the thickness of shoe 82 can be made relatively thin such that shoe 82 is lightweight, but extremely durable. Shoe 82 can be reinforced in the molding process of the present invention by combining fiberglass, carbon particles or the like with the acrylic material prior to curing. The addition of reinforcing material increases the tensile strength of shoe 82.

Figure 5:
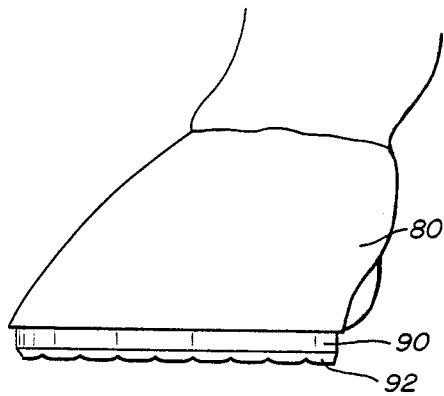
FIG. 5 is a side elevational view of a hoof fitted with an additional embodiment of the shoe of the present invention including a resilient material.

Referring now to FIG. 5, an additional embodiment of the present shoe 82 is illustrated. FIG. 5 illustrates hoof 80 having a shoe 90 which includes an elastomeric tread 92. Elastomeric tread 92 may be adhesively bonded to shoe 90 which is fabricated utilizing the procedure described above. Alternatively, the elastomeric tread 92 may be inserted in the bottom of casting mold 12 and the acrylic material placed directly on top of the elastomeric material within casting mold 12. In this manner, elastomeric material 92 becomes bonded to shoe 90 which in turn becomes bonded to hoof 80. A tread design may also be formed in bottom wall 14 of casting mold 12, such that a tread is molded into shoe 82 at the time of curing.

Figure 6:
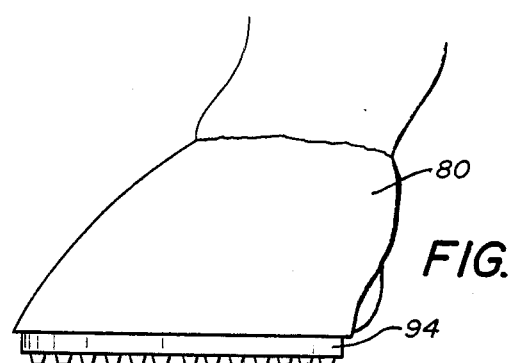
FIG. 6 illustrates a side elevational view of a hoof fitted with an additional embodiment of the shoe of the present invention including cleats.

FIG. 6 illustrates a further embodiment of the present invention which illustrates hoof 80 including a shoe 94 having cleats 96. Cleats 96 may be molded from acrylic material comprising the same material of shoe 94 in a manner as described above.

Figure 7:
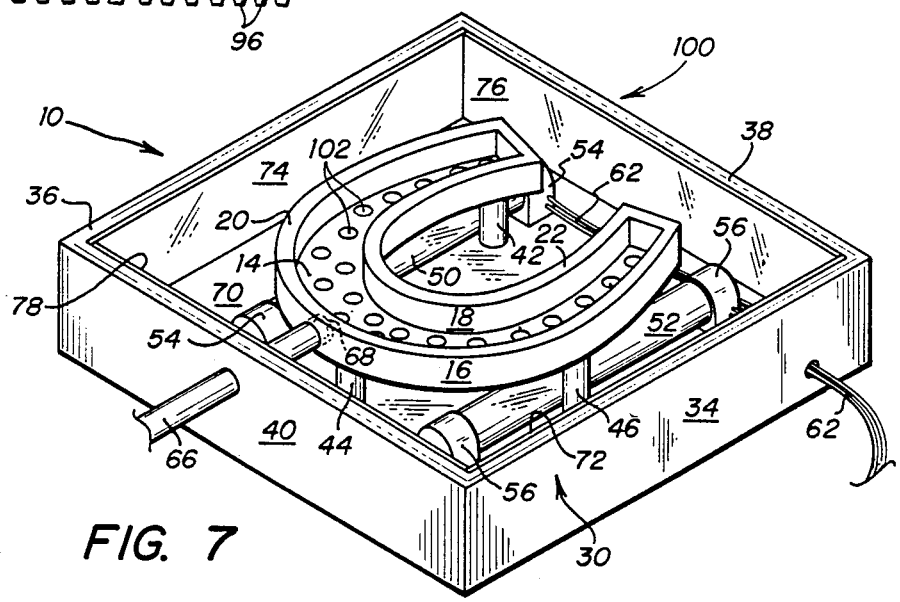
FIG. 7 illustrates a casting mold and housing for forming the shoe illustrated in FIG. 6.

Referring to FIG. 7 wherein like numerals are utilized for like and corresponding components previously described with respect to FIG. 1, a casting mold 100 for fabricating shoe 94 (FIG. 6) is illustrated. Casting mold 100 includes channels 102 formed within bottom wall 14 for forming cleats 96 (FIG. 6). Alternatively, metal spikes may be inserted within channels 102 which are then integrally molded into shoe 94 when the liquid acrylic is placed within casting mold 100.

An additional embodiment of the present invention includes the application of the acrylic material directly to the hoof 80 without the use of mold 12. The acrylic material would be rendered thicker and applied with a putty knife to hoof 80 prior to polymerization. The hoof 80 and acrylic material would then be exposed to the light source for curing.

Therefore it can be seen that the present invention including a shoe and a method of shoeing a hoofed animal which provides for a relatively thin shoe that is easily attached to the hoof of an animal without the use of mechanical fasteners or adhesives. The shoe of the present invention is fabricated directly onto the hoof of an animal such that the shoe becomes an integral part of the hoof. The underside of the hoof may include various coverings including resilient material in the form of various tread designs, cleats or smooth surfaces depending upon the type of surface the animal will be traveling upon.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A method of shoeing a hoofed animal comprising the steps of:
   forming a mixture of plastic acrylic material, a light activated initiator, and reinforcing material;
   placing the mixture directly on the bottom surface of the hoof of the animal in the general shape of the hoof and in the general area used to attach a shoe to the hoof to thereby form a shoe, such that the mixture does not extend substantially into the hoof; and
   polymerizing the mixture by exposing the mixture to light, such that the mixture solidifies on the bottom surface of the hoof without any intervening adhesives.

2. The method of claim 1 wherein the step of polymerizing the mixture includes exposing the mixture to ultraviolet light.

3. The method of claim 1 wherein the step of polymerizing the mixture includes exposing the mixture to visible light.

4. The method of claim 1 wherein the reinforcing material includes carbon particles.

5. The method of claim 1 wherein the reinforcing material includes fiberglass.

* * * * *